Figure 1:
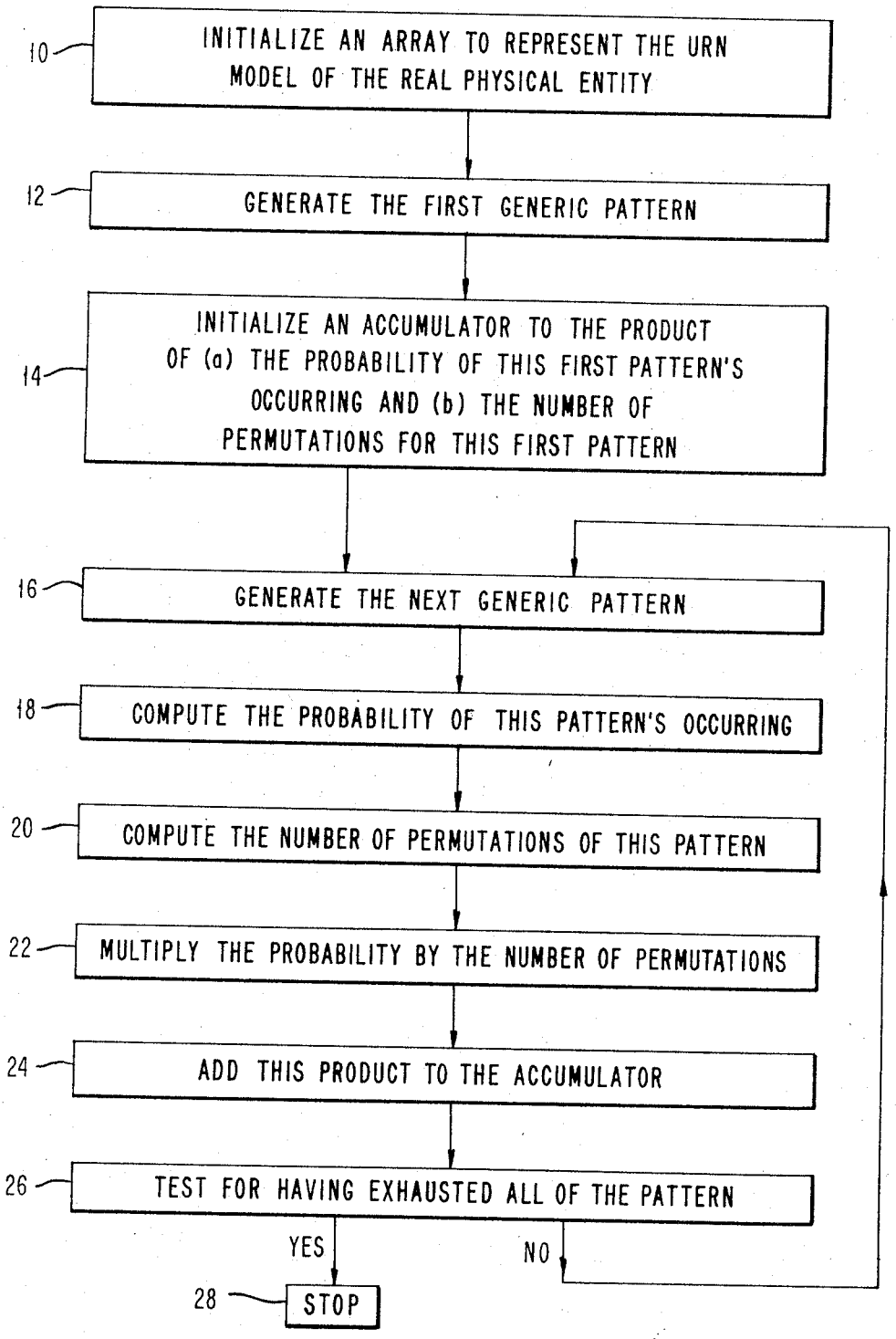
Figure 2:
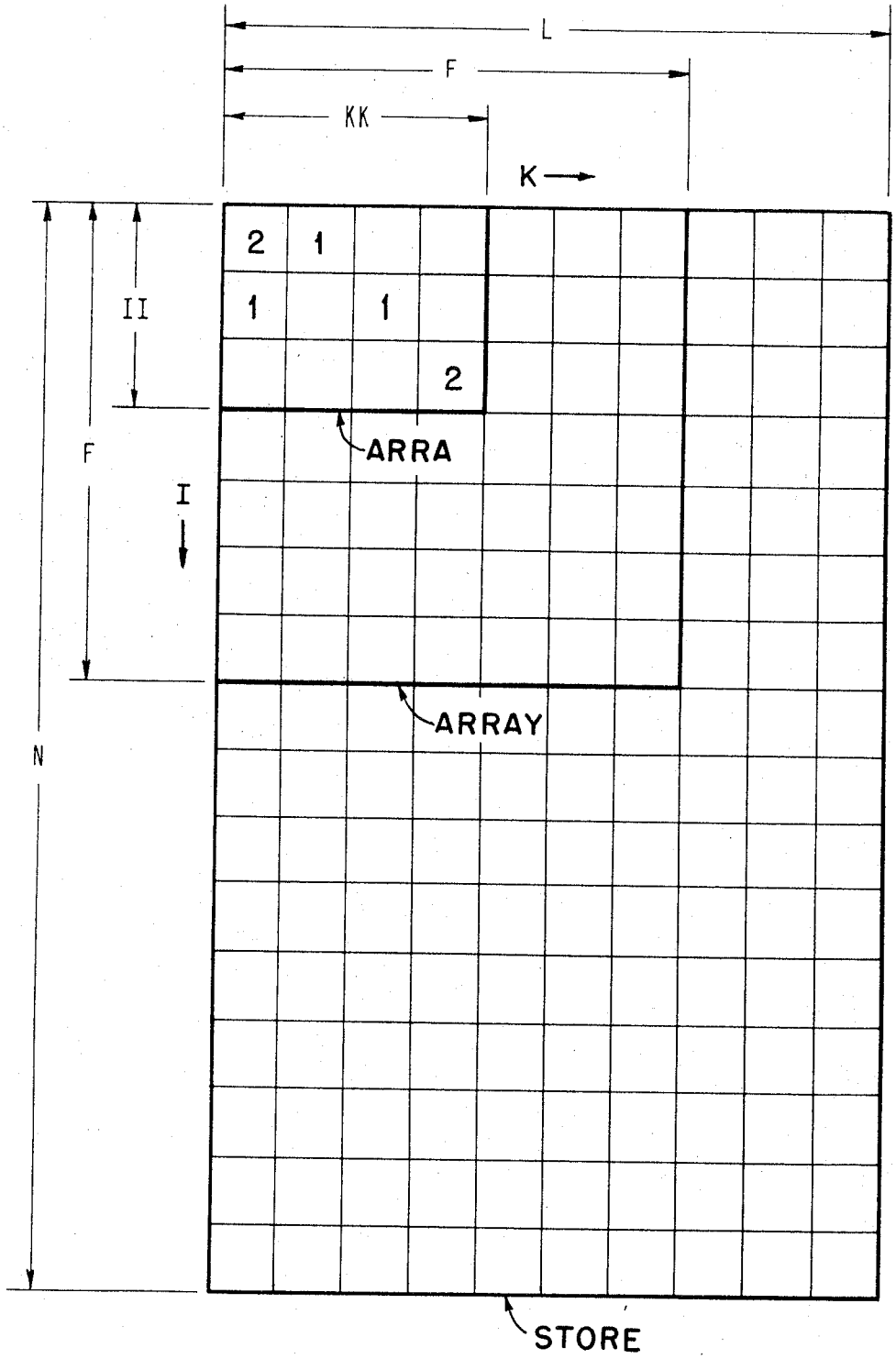

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 10, 1973

912 O.G. 400

T912,004

METHOD FOR CALCULATING SURVIVAL COEFFICIENTS

Willard G. Bouricius, Katonah, and Betty J. Schultz, New Rochelle, N.Y., assignors to International Business Machines Corporation, Armonk, N.Y.

Filed June 30, 1972, Ser. No. 267,826

Int. Cl. G06f *7/00, 9/00;* G06h *15/34*

U.S. Cl. 444—1

2 Sheets Drawing. 32 Pages Specification

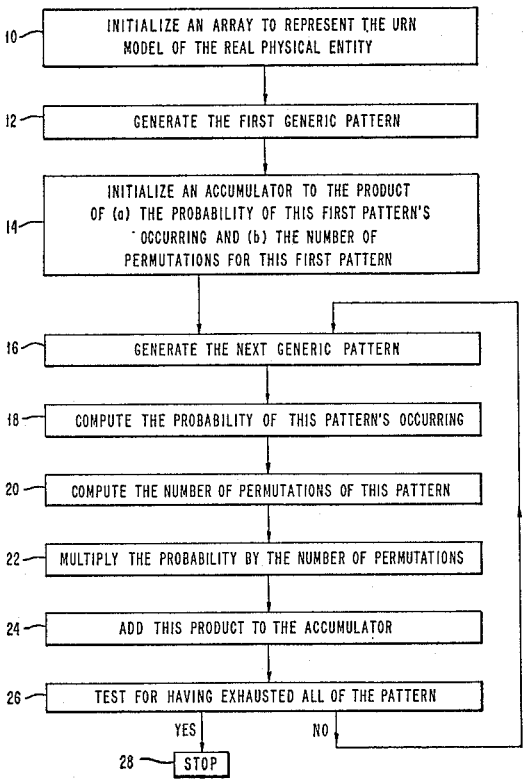

A method of determining the values of the term $H_f$ in the reliability equation for a storage organization:

$$R_{\text{store}}=\sum_{f=0}^{\infty} P_f H_f$$

wherein $P_f$ is the probability of there being $f$ failures in the organization and wherein the values of $H_f$ are the survival coefficients, the storage organization comprising a quantity of $l$ words of $n$-bit length, and being constructed so as to correct a quantity of $c$ errors. The method comprises:

(a) Generating survival patterns for given values of $c$, $f$, $n$ and $l$ wherein there are considered all of the arrays $$\begin{array}{l} S_{11}\ S_{12}\ \ldots\ S_{1l} \\ SS_{21}\ S_{22}\ \ldots\ S_{2l} \\ \cdot \\ \cdot \\ \cdot \\ S_{n1}\ S_{n2}\ \ldots\ S_{nl} \end{array}$$

wherein $S_{ij}$ is the number of failures in the $i$th bit of the $j$th word with $$R_i=\sum_{k=1}^{l} S_{ik}$$

such that (1) $$R_i \sum_{i=1}^{n} R_i=f$$

(2) $R_1 \geq R_{1+1}$ for $i=1, \ldots, (n-1)$ (3) $S_{1k} \geq S_{1k+1}$ for $k=l, \ldots, (l-1)$ and wherein the term $A_m$ is defined as the number of $R_1=m$ for $m=0, \ldots, f$, the term $B_{1m}$ is defined as being equal to the number of $S_{1k}=m$ for $m=1, \ldots, f$, the term $D_1$ is defined as $$\sum_{m=1}^{f}$$

and wherein $$\sum_{m=0}^{f} A_m=n$$

the primitives being modified by shifting each row thereof sufficiently to the right to fit a given set of replication numbers ($X_{ij}$) wherein $X_{ij}$ is equal to the number of non-zero positions introduced for the $j$th time in the $i$th row whereby, for any given primitive, the range of replication numbers, all of which produce survival patterns, are determined as follows:

$$G_{ij}=\sum_{k=1}^{i} X_{kj}$$

wherein $X_{11}=D_1$ and wherein for $i>1$ $$\sum_{j=1}^{c} X_{ij}=D_i$$

such that (4) $$0 \leq X_{ij} \leq G_{i-1,\, j-1}-G_{i-1,\, j}$$

wherein $j=l, \ldots, i$ and (5) $X_{ij}=0$ wherever $j>i$ or $j>c$ (b) Calculating the number of permutations of each survival pattern in accordance with the equation:

$$H(c, f, n, l) = \frac{l_{G_{ni}} n_n - A_0}{\prod_{m=1}^{f} \left( A_m! \prod_{i=1}^{n} B_{im}! \right)}$$

$$\times \prod_{i=1}^{n} \frac{\left( \sum_{j=1}^{c} X_{ij} \right)!}{\prod_{j=1}^{c} (X_{ij})!} \times \prod_{i=1}^{n-1} \prod_{j=1}^{c-1} (G_{ij} - G_{i,\, j+1}) x_{i+1,\, j+1}$$

(c) Calculating the probability of the occurrence of each pattern in accordance with the following expression $$\frac{f!}{(nl)^f \Pi (S_{ik})!}$$

$$i = 1, \ldots, n$$

$$k = 1, \ldots, l$$

and multiplying that probability by the number of permutations; and (d) Summing all of the products resulting from step (c) over all of the generic survival patterns.

METHOD FOR CALCULATING SURVIVAL COEFFICIENTS

Filed June 30, 1972 2 Sheets-Sheet 1

METHOD FOR CALCULATING SURVIVAL COEFFICIENTS

Filed June 30, 1972 2 Sheets-Sheet 2

STORE = N × L
ARRAY = F × F
ARRA = II × KK